United States Patent
Jorgensen et al.

(10) Patent No.: US 6,989,924 B1
(45) Date of Patent: Jan. 24, 2006

(54) DURABLE CORROSION AND ULTRAVIOLET-RESISTANT SILVER MIRROR

(75) Inventors: Gary J. Jorgensen, Pine, CO (US); Randy Gee, Arvada, CO (US)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 09/762,719

(22) PCT Filed: Aug. 5, 1999

(86) PCT No.: PCT/US99/17743

§ 371 (c)(1),
(2), (4) Date: Feb. 9, 2001

(87) PCT Pub. No.: WO00/07818

PCT Pub. Date: Feb. 17, 2000

Related U.S. Application Data

(60) Provisional application No. 60/095,884, filed on Aug. 10, 1998.

(51) Int. Cl.
*F21V 9/06* (2006.01)
*G02B 5/20* (2006.01)
*G02B 5/08* (2006.01)

(52) U.S. Cl. ............ 359/361; 359/360; 359/883; 359/884; 428/458

(58) Field of Classification Search ........... 359/350, 359/361, 584, 359, 883, 585, 360, 884; 428/195, 428/212, 458, 461, 463, 480, 325
See application file for complete search history.

(56) References Cited

U.S. PATENT DOCUMENTS

| | | | |
|---|---|---|---|
| 4,307,150 A | 12/1981 | Roche | |
| 4,645,714 A | 2/1987 | Roche et al. | |
| 5,063,112 A | 11/1991 | Gross et al. | |
| 5,069,964 A * | 12/1991 | Tolliver et al. | 428/325 |
| 5,118,540 A | 6/1992 | Hutchison | |
| 5,251,064 A | 10/1993 | Tennant et al. | |
| 5,276,600 A | 1/1994 | Takase et al. | |
| 5,361,172 A * | 11/1994 | Schissel et al. | 359/883 |
| 5,681,642 A * | 10/1997 | Sugisaki et al. | 428/195 |
| 5,846,659 A | 12/1998 | Lower et al. | |

* cited by examiner

*Primary Examiner*—Audrey Chang
(74) *Attorney, Agent, or Firm*—Paul J. White

(57) ABSTRACT

A corrosion and ultra violet-resistant silver mirror for use in solar reflectors; the silver layer having a film-forming protective polymer bonded thereto, and a protective shield overlay comprising a transparent multipolymer film that incorporates a UV absorber. The corrosion and ultraviolet resistant silver mirror retains spectral hemispherical reflectance and high optical clarity throughout the UV and visible spectrum when used in solar reflectors.

9 Claims, 4 Drawing Sheets

DURABLE CORROSION AND ULTRAVIOLET-RESISTANT SILVER MIRROR

This application claims the benefit of provisional application Ser. No. 60/095,884 filed Aug. 10, 1998.

TECHNICAL FIELD

This invention relates to specular silver mirrors. More particularly, it relates to a durable corrosion and ultraviolet-resistant silver mirror for use in solar reflectors.

BACKGROUND ART

Insufficient weather protection and ultraviolet degradation are problems, which are encountered when using solar reflectors made of a flexible specular silver mirror. When used outdoors, these mirrors must be durable and ultraviolet light (UV) resistant in order to retain their dimensional stability, aesthetic appearance, and specular-reflectance in the visible, ultraviolet, and near infra-red wavelengths.

Specular-reflectance is provided in a flexible silver mirror through a silvered composite lamina, having a thin layer of silver vapor-deposited on the surface of a flexible polyester substrate. Silver is the preferred metal because its reflectivity is substantially higher than that of other metals, such as aluminum. To retain specular reflectance over time, the prior art has focused on the application of advanced adhesives and protective films, layered over the polyester substrate and silver layer, to protect the mirrors from abrasion, weathering, and ultraviolet degradation.

Early techniques used to protect solar mirrors from abrasion, weathering, and ultraviolet degradation were developed with aluminum mirrors. For example, in U.S. Pat. No. 4,307,150, a solar reflector is disclosed wherein an opaque aluminum surface, vapor-deposited on a flexible polyester support-sheet, is protected from corrosion and weathering with an inter-polymer layer of acrylate or methacrylate copolymers. The support sheet consists of a biaxially oriented polyethylene terephthalate lamina having conventional slip agents, to facilitate winding, and a second polyethylene terephthalate lamina which contains no slip agent.

Silver is higher in specular reflection than aluminum. Thus, the logical assumption had been to substitute silver for aluminum in the solar reflector described above. However, this approach has been reported, in U.S. Pat. No. 4,645,714, to result in two undesirable phenomena. First, silver is susceptible to corrosion either through the development of pin holes in the acrylate coating or along peripheral portions of the silver-coated film. Second, a thin layer of silver, unlike a thin layer of aluminum, has a spectral window through which ultraviolet ("UV") light readily passes. The peak transmission of this light is at 320 nm, and sunlight contains ultraviolet light at this wavelength. The transmission of ultraviolet light through the silver layer degrades the underlying polyester substrate causing bubbles in the adhesives, commonly used to adhere the substrate to a rigid support. This degradation and bubbling reduces the aesthetic and specular functional properties of the solar mirror.

Corrosion inhibitors and UV absorbers, incorporated into the adhesives or protective film coatings overlaying a polyester and silver mirror substrate, have been used to retain these functional properties. However, while corrosion inhibitors do reduce corrosion, they frequently impart an unacceptable color to the mirror, over time, and do not block the ultraviolet light. In contrast, when ultraviolet light absorbers are incorporated into a protective polymer overlay, the rate of polyester support degradation is lessened, but silver corrosion is aggravated. Thus, attempts have been made to isolate the corrosion inhibitor and ultraviolet absorber elements from the mirror's reactive components in order to eliminate these undesirable effects.

In Roche, U.S. Pat. No. 4,645,714, a corrosion resistant silver mirror is disclosed wherein a corrosion inhibitor, and an ultraviolet absorber are each incorporated into separate thin overlays of an acrylate inter-polymer paint. The specular reflective mirrors are formed by vapor-depositing silver over a polyester support film. Ultraviolet degradation of the polyester support, and consequent bubbling of the underlying adhesive, is reduced by incorporating UV absorbers in a second polymer coating that is applied over a first polymer coating, which incorporates a corrosion inhibitor. The first polymer coating is applied directly over the silver reflective surface. The polymeric substrate, a coextruded biaxially oriented polyester foil, comprises: (1) a polyethylene terephthalate lamina containing conventional slip agents to facilitate winding; and (2) a polyethylene terephthalate lamina containing no slip agent, which results in an optically-smooth exposed surface. The silver specular reflective layer overlies the smooth surface, of the coextruded film, and is bonded thereto. Layered over the silver is a first acrylate or methacrylate inter-polymer coating, having a 0.5 to 2.5% glycol dimercaptoacetate dispersant, which serves as a coupling agent, primer, and corrosion inhibitor. This coating weighs 1–4 g/m$^2$. Overlying the first acrylate coating, is a second acrylate coating containing an ultraviolet absorber effective throughout the 300–400 nanometer range. The weight of the second coating is 4–8 g/m$^2$. Inclusion of the corrosion inhibitor and the UV absorber into separate layers is designed to keep the UV absorber out-of-contact with the silver, and to avoid any corroding effect. On the opposite side of the coextruded polyester support is a uniform coating, weighing about 10–15 g/m$^2$, of a tacky and pressure-sensitive adhesive (95:5 isooctyl acrylate:acrylamide copolymer). A conventional release liner, such as a silicone-coated polyester film, may be used to protect the adhesive prior to use. The disclosure of U.S. Pat. No. 4,645,714 is incorporated by reference as though fully set forth herein.

It is believed, however, by Hutchinson, U.S. Pat. No. 5,118,540, that the reflective films described in U.S. Pat. Nos. 4,307,150, and 4,645,714 are generally unsuitable for solar energy applications. Under outdoor conditions, the thin acrylate flood coat of these films tends to weather poorly and to quickly erode. These coatings thus offer an insufficient protective barrier to abrasion and moisture. Where the solar mirror comprises a substrate having a polyester support sheet and a layer of silver, as the outer acrylate flood coat, containing UV absorbers, erodes, ultraviolet light degrades the polyester support, and the mirror's aesthetic appearance and optical efficiency fail. In order to mitigate this problem, Hutchinson discloses the use of corrosion inhibitors and ultraviolet absorbers in an adhesive, which is used to bond an abrasion and moisture resistant fluorocarbon protective coating over a polyester and silver mirror substrate. The relevant embodiment, therein, describes a corrosion and ultraviolet light resistant flexible reflective film, where the respective inhibitors and absorbers are incorporated into separate coatings of an adhesive. A thin layer of silver is vapor-deposited on a flexible polyester support sheet, producing the specular silver surface. The adhesive is used to bond a fluorocarbon film, having an abrasion and weather resistant function, to the surface of the silver. The adhesive is applied in two separate layers. The first adhesive layer is adjacent to the silver deposit and contains a corrosion inhibitor. The second adhesive layer contains a UV absorber and overlays the first adhesive layer for use in bonding the fluorocarbon protective film to the silver surface. The use of adhesives to bond the fluorocarbon film to the silver surface is a required element of this construction, because fluorocarbon films do not bond to metal surfaces. However, this construction is not without its deficiencies when used, over time, as a solar mirror. Under ultraviolet light, the application of advanced adhesives (those incorporating UV absorbers and corrosion inhibitors) directly onto a silver substrate has resulted in degradation of the silver/adhesive interface. When silver is adhered directly to acrylic films tunnel and delamination failures have also occurred. Moreover, fluorocarbon protective films, without UV absorbers, often provide an insufficient weather resistant shield. For these reasons, it is believed that these silver mirrors when applied as solar reflectors remain lacking in long-term durability, which results in a loss of optical efficiency and aesthetic appearance.

In view of the foregoing considerations, a need therefore exists for a durable silver mirror, which is corrosion and weather resistant, effectively screens ultraviolet light, and retains its specular optical efficiency and aesthetic appearance when used as a component in solar reflectors.

SUMMARY

It is therefore an object of the invention to provide a durable silver mirror for use in solar reflectors.

It is another object of the invention to provide a durable silver mirror, which is corrosion and weather resistant, effectively screens ultraviolet light, and retains its specular optical efficiency and aesthetic appearance when used as a component in solar reflectors.

It is yet another object of the invention to provide a method for making a flexible silver mirror for use in solar reflectors.

The foregoing specific objects and advantages of the invention are illustrative of those which can be achieved by the present invention and are not intended to be exhaustive or limiting of the possible advantages which can be realized. Thus, those and other objects and advantages of the invention will be apparent from the description herein or can be learned from practicing the invention, both as embodied herein or as modified in view of any variations which may be apparent to those skilled in the art.

Briefly, the invention provides, in a silver mirror having a polymeric substrate, a thin specular-reflective silver layer overlying the substrate and bonded thereto, and a thin protective layer of film-forming polymer overlying the exposed surface of the silver layer, the protective layer firmly adherently bonded thereto, the improvement, comprising: an ultraviolet absorbing polymer film adhered to the exposed surface of the protective layer.

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

DESCRIPTION OF THE PREFERRED EMBODIMENTS

The present invention provides a durable silver mirror, and a method for making the mirror, having weather and corrosion resistance and effective ultraviolet screening. These features provide long-term durability and a retention in specular optical-efficiency and aesthetic. These silver mirrors are useful for application to solar reflectors, used outdoors.

Figure 1:
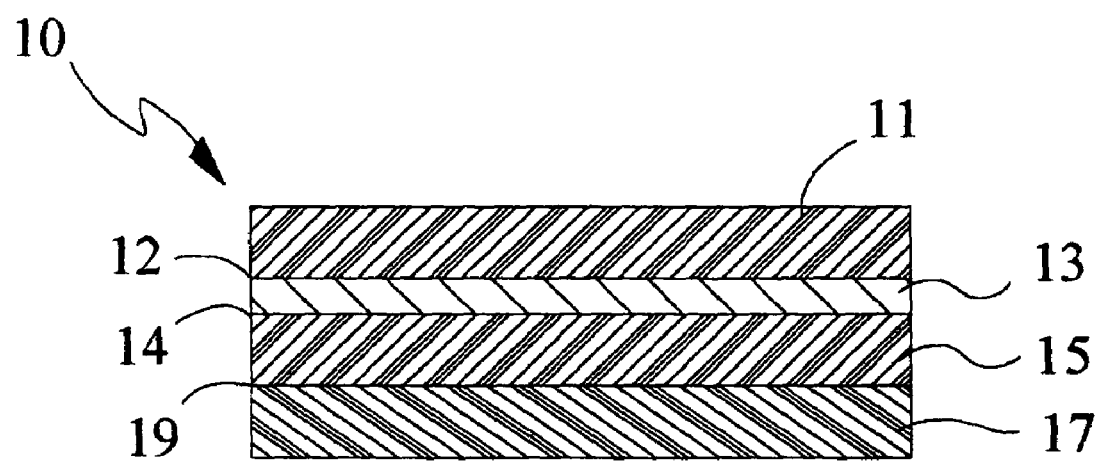
FIG. 1 is a cross-sectional view of the simplest form of the invention.

With reference now to the drawing figures, wherein like numerals represent like elements, there is generally shown the silver mirror 10, in FIG. 1, in its most basic configuration. The silver mirror 10 is comprised of a polymeric substrate 11 having a thin, vapor-deposited, silver overlay 13, which exhibits a specular reflectance. Bonded to the surface interface 14, of the silver layer 13, is a thin layer of a film-forming protective polymer 15. Long-term durability and the retention of specular optical-efficiency and aesthetic appearance is provided through the incorporation of a protective shield overlay 17, comprising a transparent multipolymer film, such as acrylic, that incorporates UV absorbers. This film 17 also shields the reflective interface 14 and the underlying adhesives from UV degradation. Lamination of the UV absorbing polymer 17 to the protective filmforming polymer 15 is done by means of an optical quality adhesive, a solvent weld, or ultrasonic weld at interface 19. These adherent means are characterized by good adhesion, high optical performance, and durability. Both the supersubstrate 17, and the film-forming polymer 15, are sufficiently transparent to visible light such that the silver 13 specular surface may be observed and the high inherent reflectivity of the silver 13 fully utilized.

Figure 2:
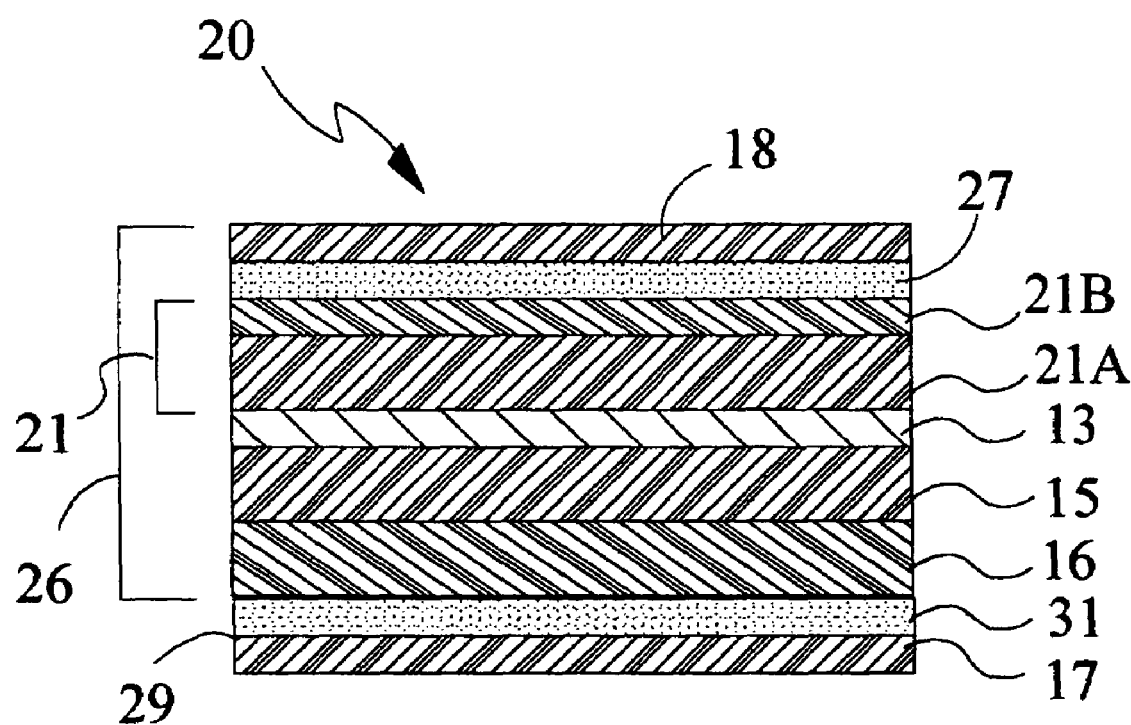
FIG. 2 is a cross-sectional view of a preferred form of the invention.

Referring now to FIG. 2, mirror 20, of the drawing, is a preferred embodiment of the invention. In this embodiment, silver layer 13 is vapor-deposited on the smooth-surface of a coextruded biaxially oriented polyester foil 21, which consists of a polyethylene terephthalate lamina 21B having conventional slip-agents, and a polyethylene terephthalate lamina 21A which does not contains a slip-agent resulting in an exposed surface that is optically smooth. On the opposite surface of lamina 21B is normally tacky and pressure-sensitive adhesive layer 27, which in turn is protectively covered by a release liner 18. For application of the mirror 20 to a solar reflector, the release liner 18 is removed and the adhesive layer 27 is used to firmly adhere the mirror 20 to the solar reflector base (not shown).

In the figure, the layered film-assembly 26 of mirror 20 may be, for example, a high performance specular silver reflective film, such as the SILVERLUX polyester film, which is manufactured by the 3M Company under the trade designation SS-95P. The SILVERLUX film 26 is conventional in construction and is commercially available with a removable premask (not shown) to protect the silver surface 13 prior to application. Layer 15 is a thin acrylate coating that incorporates a corrosion inhibitor and layer 16 is another thin acrylate overcoat that incorporates UV absorbers. The SILVERLUX film 26 uses a pressure-sensitive adhesive layer 27 for ease in permanent application to most smooth non-porous substrates, and an adhesive 27, which is protected by a release liner 18. The two thin acrylate films 15 and 16, of assembly 26, tend, however, to weather poorly and to quickly erode away when used outdoors as solar mirrors. Assembly 26 incorporates a polyester support sheet 21 and a layer of silver 13. The presently preferred material for the substrate 21 is, as previously indicated, polyethylene terephthalate, which is susceptible to ultraviolet light degradation upon weathering. Ultraviolet light causes the polyester support sheet 21 to degrade and the reflective film 26 too eventually lose specular reflectivity during accelerated weathering.

This degradation and loss of specular reflectance is, however, substantially overcome through bonding an overlay of a highly transparent acrylic multipolymer film 17, containing UV absorbers, to the surface of film 26. Disposed between the second acrylate layer 16 and the acrylic multipolymer film 17 is a bonding interface 29. In FIG. 2, an adhesive 31 may is used to bond layers 16 and 17. The adhesive 31 is highly optically transmissible to visible, ultraviolet, and near infra-red light. The acrylic multipolymer film 17, with UV absorbers incorporated therein, is a durable weather resistant acrylic shield which retains an adequate strength, for its function, and original aesthetics with outdoor exposure over time. The acrylate polymer film 17 may be, for example, the KORAD KLEAR high gloss acrylic film, which is commercially available under the trade designations KORAD KLEAR 05005 in a roll thickness of 2–8 mil, or the 3M Company extruded acrylic film sold under the trade designation 3M X09105, which is 3.5 mil thick.

Figure 3:
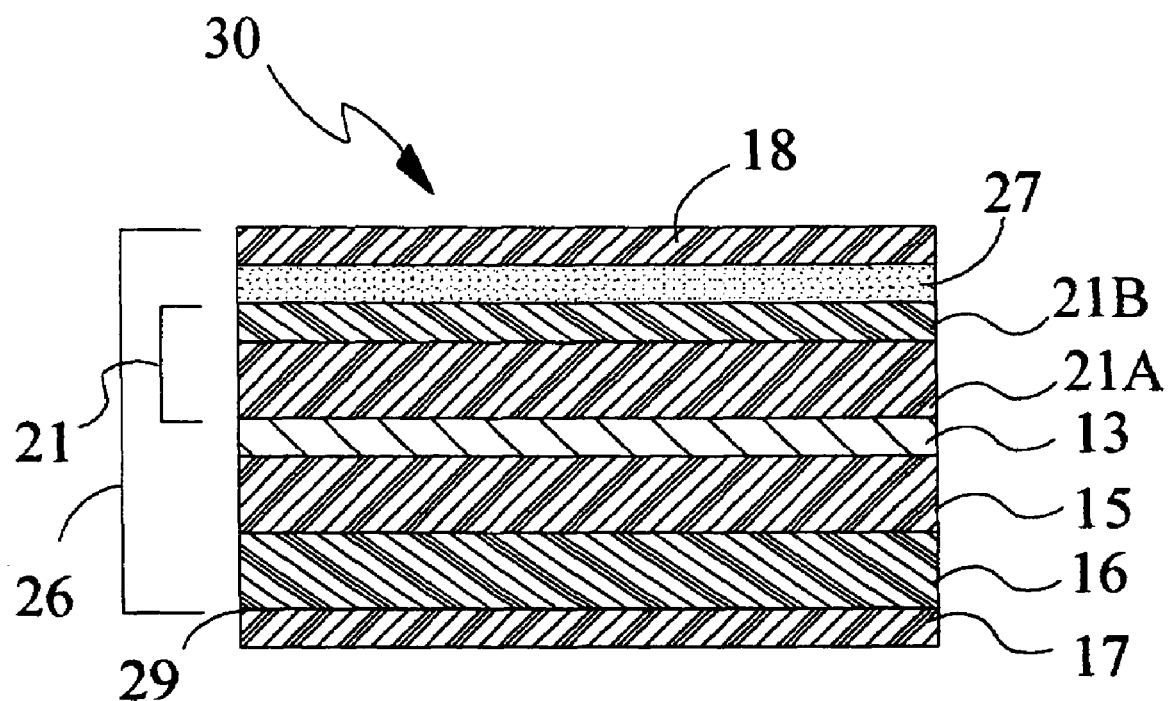
FIG. 3 is a cross-sectional view of another preferred form of the invention.

Turning now to FIG. 3, mirror 30 is another preferred embodiment of the invention. Here, as in FIG. 2, disposed between second polymeric layer 16 and acrylate polymeric layer 17 is a bonding interface 29. However, unlike FIG. 2, layer 16 and acrylic polymer film 17 are bonded together by means of a solvent or ultrasonic weld, which thereby eliminates the need for the adhesive compound 31 of FIG. 2. While the weld at interface 29 is preferably provided by an ethanol organic solvent, it is understood that other organic solvents, such as acetone, having like properties would also be suitable for bonding layers 16 and 17.

EXPERIMENT

Figure 4:
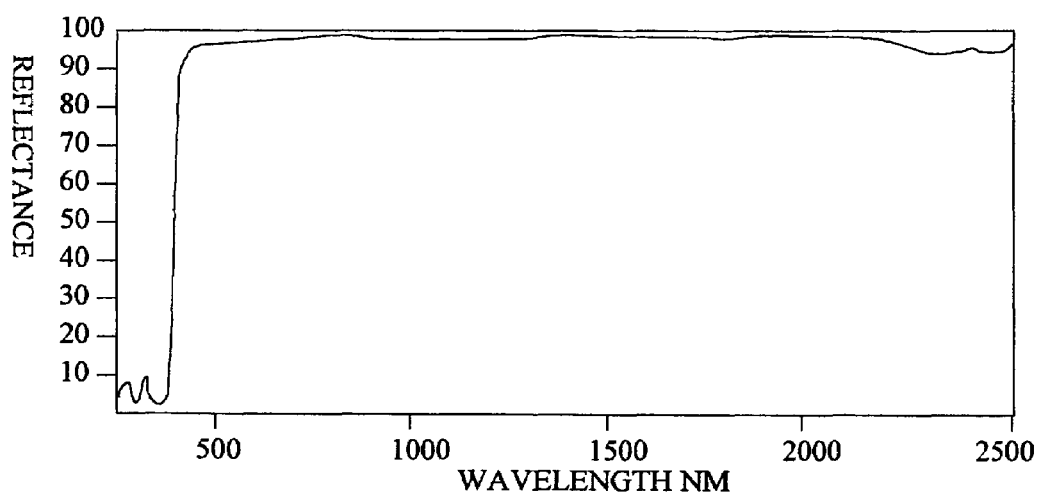
FIG. 4 is a plot of the measured Spectral Hemispherical Reflectance, as a function of wavelength, which illustrates the optical clarity of the embodiment according to FIG. 3.

In parallel runs, separate samples of KORAD KLEAR 05005 (1¾*2⅝ inches) were solvent-welded, with ethanol, over a SILVERLUX reflective film. This method resulted in a silver mirror according to the construction set forth in FIG. 3, of the drawings. The ethanol solvent weld, in peel tests, resulted in an extremely adherent bond. Referring now to FIG. 4, it is shown a plot of the measured Spectral Hemispherical Reflectance, as a function of wavelength, for the KORAD KLEAR 05005 film solvent-welded to the SILVERLUX film. As shown in the figure, the solvent-welded KORAD KLEAR 05005 and SILVERLUX reflector construction resulted in a silver mirror, which retained its high optical clarity throughout the UV and visible spectrum.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

What is claimed is:

1. In a silver mirror, comprising a polymeric substrate, a specular-reflective silver layer overlying and bonded to said substrate, a protective layer of a transparent film-forming acrylate polymer incorporating a corrosion inhibitor and overlying and bonded to an exposed surface of said silver layer, and a second acrylate polymer incorporating a UV inhibitor bonded to said protective layer, the improvement comprising a corrosion and ultraviolet-resistant- protective shield layer on said second acrylate polymer, said protective shield layer comprising: an overlay of a transparent multipolymer film of a thickness range of 2–8 mil that incorporates a UV absorber, and is adhered to an exposed surface of said second acrylate polymer or to an adhesive layer on said second acrylate polymer that is highly optically transmissible to visible, ultraviolet, and near infrared light to enable said silver layer to retain spectral hemispherical reflectance and optical clarity throughout the UV and visible spectrum when used in solar reflectors.

2. The silver mirror of claim 1, wherein the ultraviolet incorporated transparent multipolymer film is an acrylic polymer.

3. The silver mirror of claim 1, wherein the ultraviolet incorporated transparent multipolymer film is selected from the group consisting of polycarbonate, polyester, polyethylene naphthalate or a fluoropolymer.

4. The silver mirror of claim 1, wherein the ultraviolet incorporated transparent multipolymer film is adhered to the exposed surface of the second acrylate polymer by a solvent weld.

5. The silver mirror of claim 1, wherein the ultraviolet incorporated transparent multipolymer film is adhered to the exposed surface of the second acrylate polymer by a thermal weld.

6. The silver mirror of claim 1, wherein the ultraviolet incorporated transparent multipolymer film is adhered to the exposed surface of the protective layer by an ultrasonic weld.

7. A method for making a silver mirror, comprising:
(a) providing a polymeric substrate;
(b) bonding a specular-reflective silver layer to said polymeric substrate;
(c) bonding a protective layer of a transparent film-forming acrylate polymer incorporating a corrosion inhibitor to said silver layer and bonding a second acrylate polymer incorporating a UV inhibitor to said protective layer; and
(d) adhering a protective shield layer to an exposed surface of said second acrylate polymer or to an adhesive layer on said second acrylate polymer that is highly optically transmissible to visible, ultraviolet, and near infrared light; said protective shield layer comprising a transparent multipolymer film of a thickness range of 2–8 mil that incorporates a UV absorber that enables said silver layer to retain spectral hemispherical reflectance and high optical clarity throughout the UV and visible spectrum when used in solar reflectors.

8. The method of claim 7, wherein the ultraviolet incorporated transparent multipolymer is acrylic.

9. The method of claim 7, wherein the ultraviolet incorporated transparent multipolymer is selected from the group consisting of polycarbonate, polyester, polyethylene naphthalate or fluoropolymer.

* * * * *

UNITED STATES PATENT AND TRADEMARK OFFICE
CERTIFICATE OF CORRECTION

PATENT NO.         : 6,989,924 B1
APPLICATION NO. : 09/762719
DATED              : January 24, 2006
INVENTOR(S)        : Gary J. Jorgensen and Randy Gee It is certified that error appears in the above-identified patent and that said Letters Patent is hereby corrected as shown below:

At column 1, line 7 insert :

"The United States Government has rights in this invention pursuant to Contract No. DE-AC36-99GO10337 between the United States Department of Energy and the Midwest Research Institute."

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,989,924 B1 | Page 1 of 1 |
| APPLICATION NO. | : 09/762719 | |
| DATED | : January 24, 2006 | |
| INVENTOR(S) | : Gary J. Jorgensen et al. | |

It is certified that error appears in the above-identified patent and that said Letters Patent is hereby corrected as shown below:

Title Page, correct Item (75) Inventors, to read:

-- Gary J. Jorgensen, Pine, CO (US); Randy Gee, Arvada, CO (US); David E. King, Lakewood, CO (US) --.

Signed and Sealed this

Thirteenth Day of January, 2015

Michelle K. Lee
*Deputy Director of the United States Patent and Trademark Office*